(12) United States Patent
Cook (10) Patent No.: US 9,970,521 B1
(45) Date of Patent: May 15, 2018

(54) INFINITELY VARIABLE TRANSMISSION

(71) Applicant: Rodney J. Cook and successors in trust, as trustee under Rodney J. Cook revocable trust dated February 13, 1997, Clearwater, KS (US)

(72) Inventor: Rodney Jay Cook, Clearwater, KS (US)

(73) Assignee: Rodney J. Cook and successors in trust, Wichita, KS (US), as trustee under Rodney J. Cook revocable trust dated February 13, 1997

( * ) Notice: Subject to any disclaimer, the term of this patent is extended or adjusted under 35 U.S.C. 154(b) by 0 days. days.

(21) Appl. No.: 15/424,497

(22) Filed: Feb. 3, 2017

Related U.S. Application Data (60) Provisional application No. 62/389,401, filed on Feb. 26, 2016.

(51) Int. Cl.
| | |
|---|---|
| *F16H 15/40* | (2006.01) |
| *F16H 37/02* | (2006.01) |
| *F16H 37/08* | (2006.01) |

(52) U.S. Cl.
CPC .......... *F16H 37/022* (2013.01); *F16H 15/40* (2013.01); *F16H 37/0813* (2013.01); *F16H 2037/026* (2013.01)

(58) Field of Classification Search
CPC .... F16H 3/728; F16H 2037/104; F16H 3/727; F16H 37/084; F16H 2037/106; F16H 37/0813; F16H 37/022
See application file for complete search history.

(56) References Cited

U.S. PATENT DOCUMENTS

| | | | |
|---|---|---|---|
| 4,459,868 | A | 7/1984 | Sargent |
| 4,602,525 | A | 7/1986 | Moroto |
| 4,919,007 | A | 4/1990 | Van der Hardt Aberson |
| 5,045,028 | A | 9/1991 | Rattunde |
| 5,681,235 | A | 10/1997 | Ketcham |
| 5,690,576 | A | 11/1997 | Moroto |
| 5,916,053 | A | 6/1999 | McCarrick |
| 6,092,432 | A | 7/2000 | Klaricic |
| 6,174,260 | B1 | 1/2001 | Tsukada |
| 6,210,298 | B1 | 4/2001 | Baur |
| 6,447,422 | B1 | 9/2002 | Haka |
| 6,824,496 | B2 | 11/2004 | Mason |

(Continued)

*Primary Examiner* — Justin Holmes
*Assistant Examiner* — Lillian T Nguyen
(74) *Attorney, Agent, or Firm* — Robert Blinn (57) ABSTRACT

An infinitely variable transmission includes an input differential and an output differential. The input differential and the output differential both include differentially associated forward path and reverse path gear members. The forward path gear members are meshed indirectly through an idler gear and the reverse path gear members mesh directly to cause counter-rotation of the output differential gear members. The input differential gear members are controlled by a variator so that the forward path gear members may be regulated to rotate faster than the reverse path gear members to cause forward rotation of the output shaft, or so that the forward path gear members may be regulated to rotate slower than the reverse path gear members to cause reverse rotation of the output shaft or so that the forward and reverse path gear members rotate at the same speed to make the output shaft stationary.

7 Claims, 7 Drawing Sheets

(56) References Cited

U.S. PATENT DOCUMENTS

| | | |
|---|---|---|
| 6,913,555 B2 | 7/2005 | Benassi |
| 6,997,848 B1 | 2/2006 | Cillessen |
| 7,048,667 B2 | 5/2006 | DeVincent |
| 7,077,782 B2 | 7/2006 | Mason |
| 7,232,396 B2 | 7/2007 | Reisch |
| 7,574,935 B2 | 8/2009 | Rohs |
| 7,654,930 B2 | 2/2010 | Rohs |
| 7,665,377 B2 | 2/2010 | Harrelson |
| 7,682,278 B2 | 3/2010 | Rohs |
| 8,187,185 B2 | 5/2012 | Saikai |
| 8,307,936 B2 | 11/2012 | Bailly |
| 8,574,110 B2 | 11/2013 | Hoffman |
| 8,594,898 B2 | 11/2013 | Totsuka |
| 9,133,924 B2 | 9/2015 | Schoolcraft |
| 9,228,650 B2 | 1/2016 | Schoolcraft |
| 9,243,693 B2 | 1/2016 | Sorze |
| 9,341,242 B2 | 5/2016 | Gotz |
| 9,366,328 B2 | 6/2016 | Yoshino |
| 9,382,988 B2 | 7/2016 | Schoolcraft |
| 2004/0204283 A1* | 10/2004 | Inoue ............... F16H 37/086 476/46 |
| 2005/0187047 A1 | 8/2005 | Benassi |
| 2010/0093479 A1* | 4/2010 | Carter ............... F16H 15/28 475/159 |
| 2012/0238384 A1 | 9/2012 | Lee |
| 2012/0309581 A1 | 12/2012 | Choi |
| 2013/0303325 A1* | 11/2013 | Carey ............... F16H 37/022 475/214 |
| 2014/0038761 A1* | 2/2014 | Xu ................... F16H 37/022 475/214 |
| 2014/0155220 A1 | 6/2014 | Messier |
| 2014/0248990 A1 | 9/2014 | Ivan |
| 2015/0299984 A1 | 10/2015 | Mattinson |
| 2016/0116036 A1 | 4/2016 | Schoolcraft |
| 2016/0123438 A1 | 5/2016 | Ziech |
| 2016/0178035 A1 | 6/2016 | Tay |

* cited by examiner

INFINITELY VARIABLE TRANSMISSION

CROSS REFERENCES TO RELATED APPLICATIONS

This application claims the benefit of U.S. Provisional Patent Application No. 62/389,401 filed on Feb. 26, 2016 which is incorporated herein by reference.

FIELD

This invention relates to an infinitely variable transmission.

BACKGROUND

An infinitely variable transmission (IVT) is able to vary the speed ratio between an input shaft and an output shaft continuously within a desired range of ratios. And preferably, is able to achieve continuous adjustment within a range of ratios including ratios that provide a maximum forward speed, a neutral condition in which the output shaft is stationary and a maximum reverse speed. Continuously Variable Transmissions (CVTs) are currently in widespread use, particularly in smaller automobiles. CVTs typically provide continuously variable ratios by employing a pulley assembly which includes a pair of adjustable pulleys and a special belt which transfers power between the adjustable pulleys. Each pulley has two spaced conical elements in which the spacing is able to be continuously varied thereby varying the effective diameter of each pulley. Typically, the pulleys are adjusted in unison in a corresponding manner so that the length of the belt path remains constant. Thus, in a CVT, if the input pulley is at a minimum diameter and the output pulley is at a maximum diameter, the "gear ratio" will be at a minimum which causes the output shaft to rotate at a minimum speed. On the other hand, if the input pulley is at a maximum diameter and the output pulley is at a minimum diameter, the resulting ratio will be at a maximum for what may be commonly referred to as "overdrive". However, as the skilled reader will note from the above description of the CVT belt drive mechanism, CVTs do not provide a smooth transition from a zero output speed (neutral) to a low speed. And, further, CVTs do not provide a smooth transition between neutral and reverse. In a CVT, the reverse capability is usually addressed by providing forward and reverse clutches arranged with a planetary gear set that is associated with the input shaft. Depending on which clutch is engaged, either a forward direction or a reverse direction for the input to the variable pulley assembly is selected. However, CVTs suffer from some notable disadvantages. The torque carrying capacity of the pulley belt arrangement described above is limited. The belt and pulley components described above are particularly susceptible to wear and, therefore, the materials and process that must be used to make these components increase costs. What is needed is an IVT that addresses the above noted disadvantages and that is able to smoothly and continuously vary the output of the transmission between a range of forward output ratios and a range of reverse output ratios.

SUMMARY

The above noted need is addressed by an infinitely variable transmission that includes an input differential and an output differential. The input differential and the output differential both include differentially associated forward path and reverse path gear members. The reverse path gear members are meshed directly with each other and forward path gear members are meshed through an idler gear to cause counter-rotation of the output differential gear members. The input differential gear members are controlled by a variator that provides a continuous range for the selection of speed ratios between the forward path and the reverse path so that the forward path gear members may be regulated to rotate faster than the reverse path gear members to cause forward rotation of the output shaft, or so that the reverse path gear members may be regulated to rotate faster than the forward path gear members to cause reverse rotation of the output shaft or so that the forward and reverse path gear members rotate at the same speed to make the output shaft stationary, thereby causing a neutral condition for the IVT. Accordingly, the ratio of the speeds of the output shaft and the input shaft may be continuously varied and the direction of rotation of the output shaft may be changed to facilitate the selection of any one of an infinite number of output conditions between a maximum forward ratio and a maximum reverse ratio.

DETAILED DESCRIPTION

Figure 1:
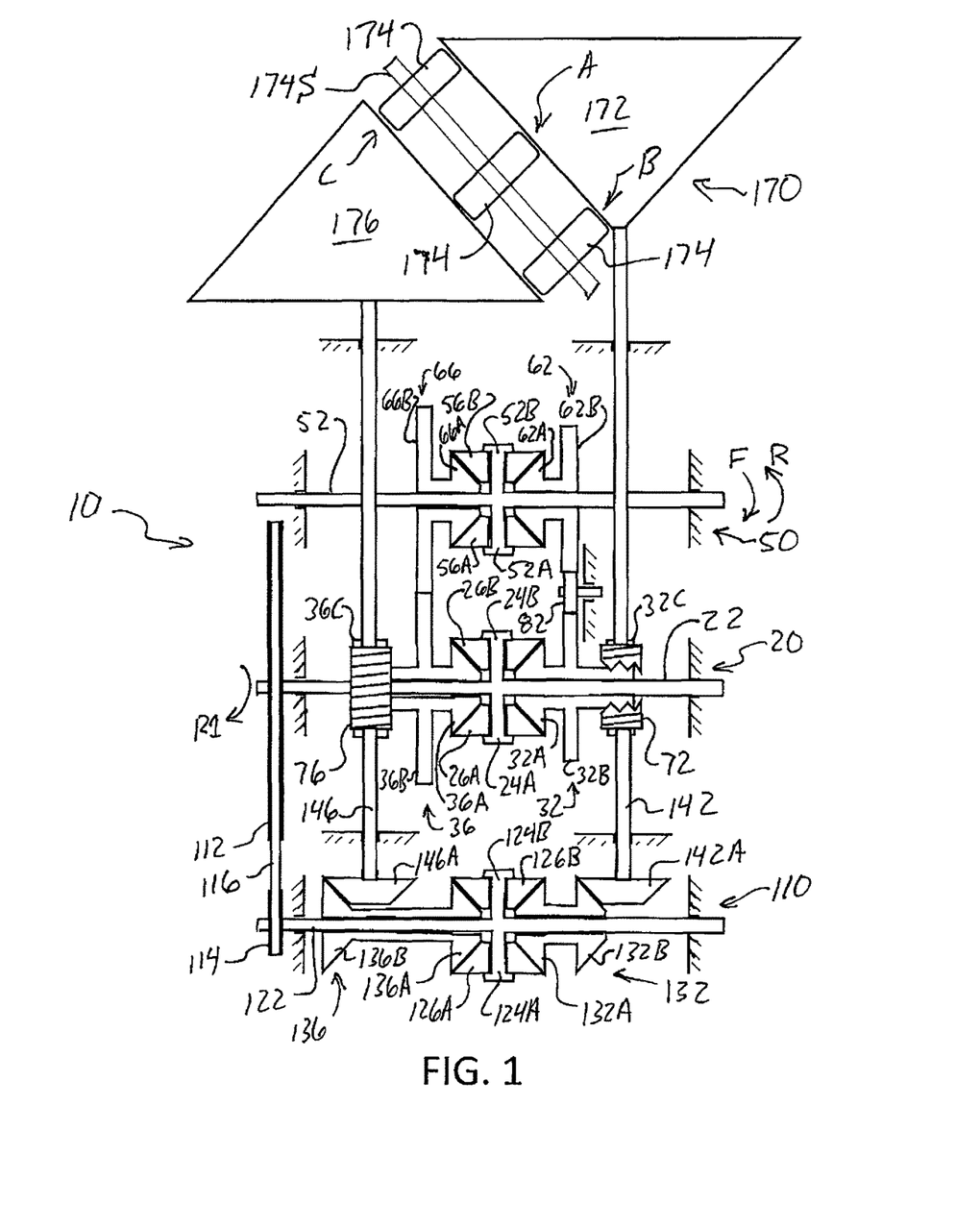
FIG. 1 is a first plan view of one embodiment of an infinitely variable transmission.
Figure 2:
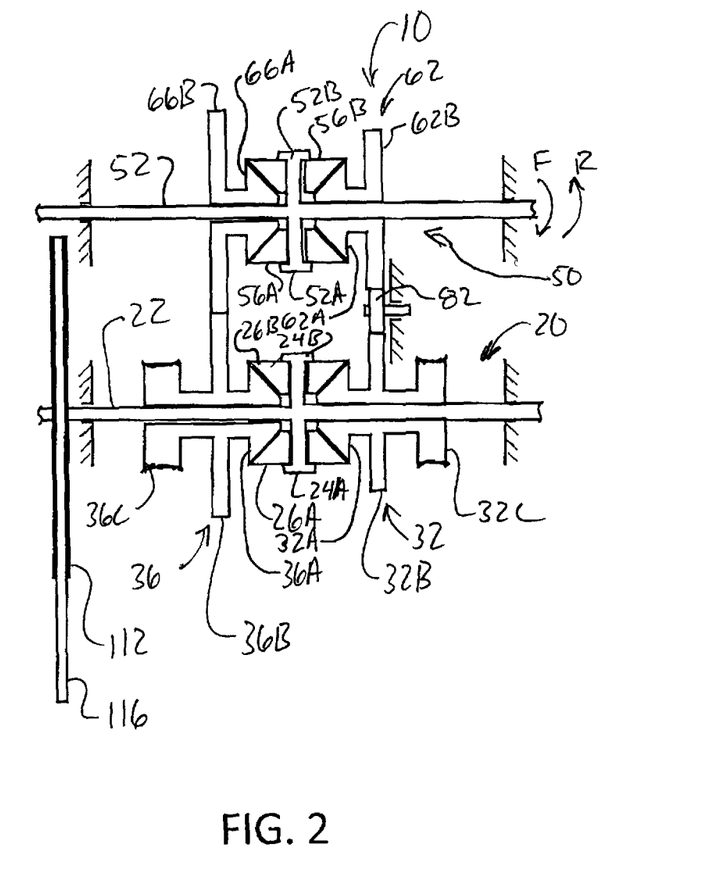
FIG. 2 is a plan view showing only the input differential and the output differential of one embodiment of the infinitely variable transmission.
Figure 3:
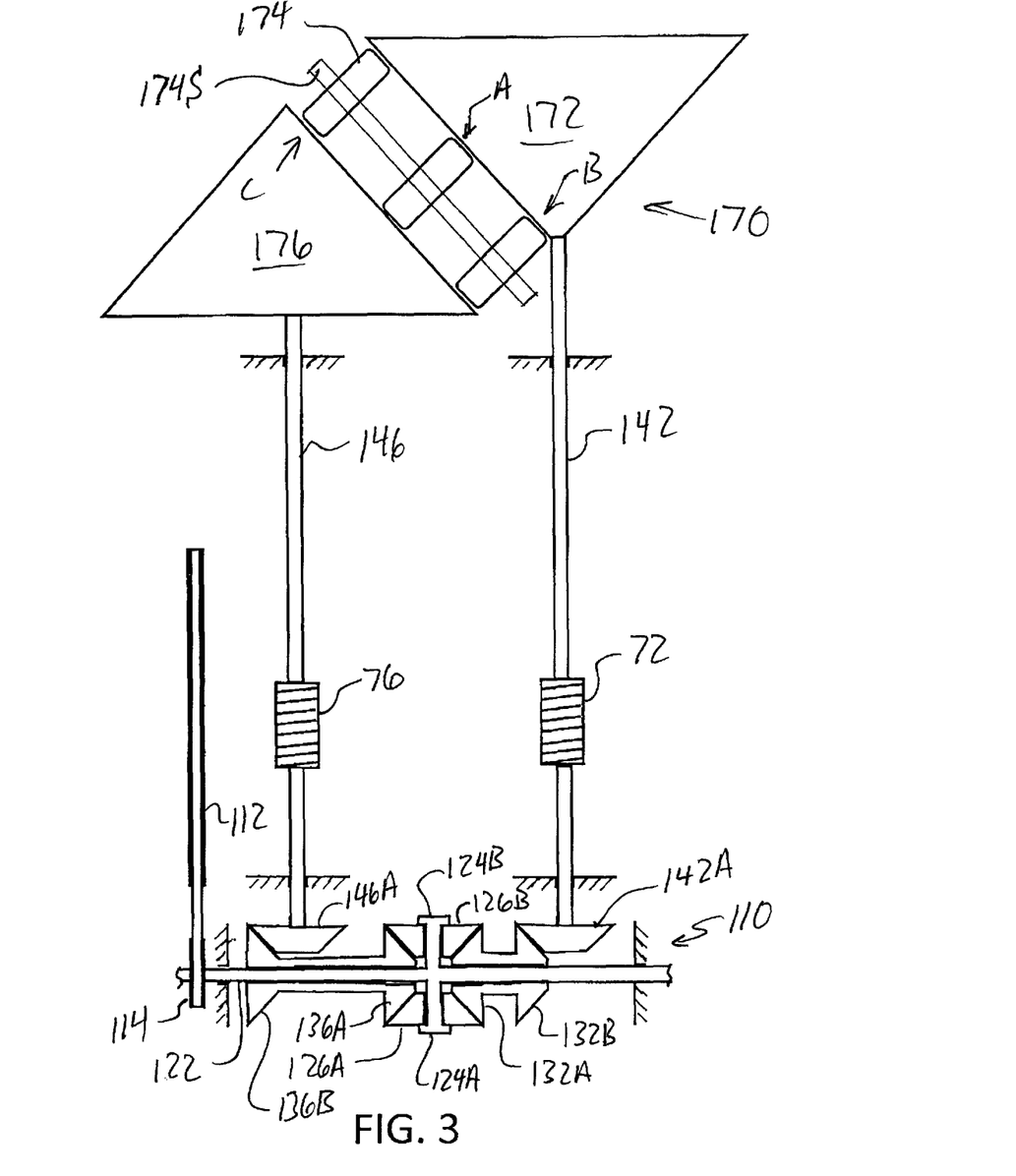
FIG. 3 is a plan view showing only the variator assembly and the control differential of one embodiment of the infinitely variable transmission.
Figure 4:
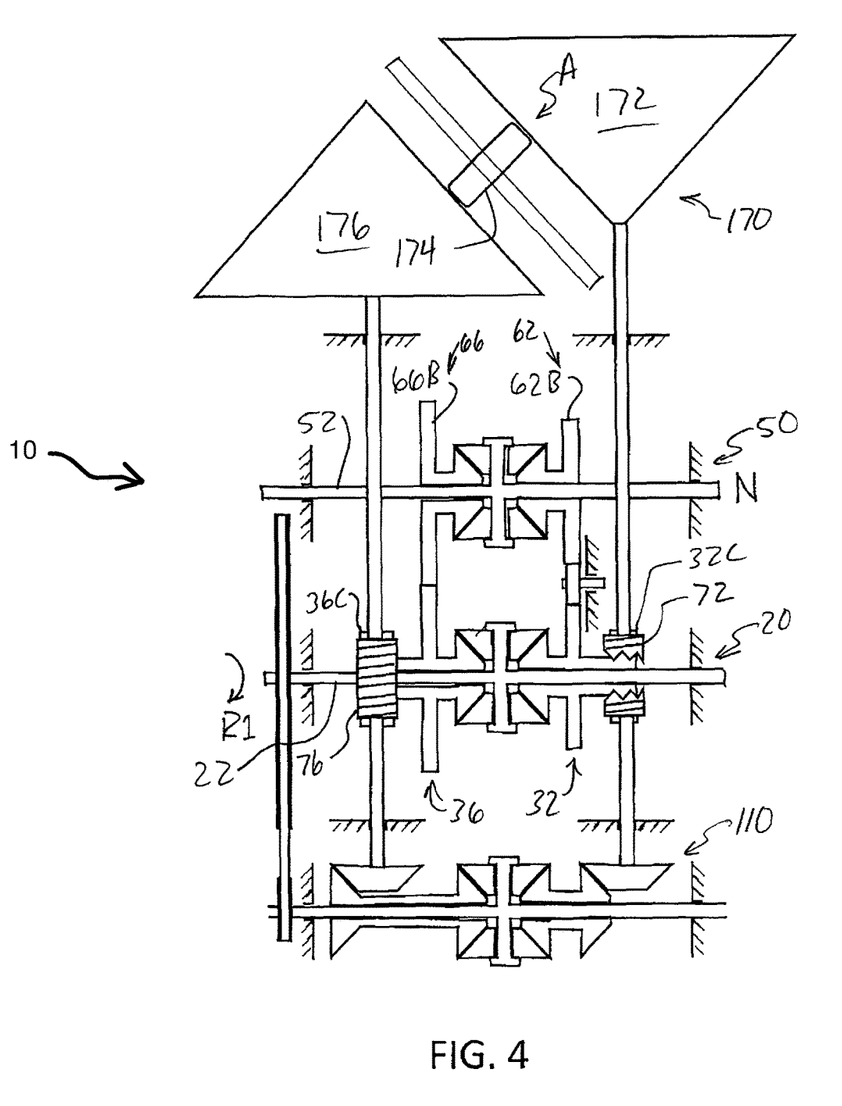
FIG. 4 is a second plan view of one embodiment of the infinitely variable transmission showing the infinitely variable transmission arranged for a neutral condition in which the output shaft is stationary regardless of the speed of the input shaft.

Referring to the figures, FIG. 1 provides a plan view of one embodiment of an infinitely variable transmission 10. In this regard, the term "infinitely variable transmission" ("IVT") is intended to refer to a transmission that is able to receive an input from a prime mover via a rotating, powered input shaft and provide an output typically in the form of an output shaft wherein the output shaft of the IVT is able to be continuously adjusted between at least a first condition in which the IVT output shaft is rotating with a first rotation speed and a second condition in which the output shaft is rotating with a second rotation speed. In practice, the first condition may be a neutral condition in which the output shaft is not rotating and the second condition may be a driving condition wherein the IVT output shaft is rotating in a direction that may be considered as a forward direction and with a maximum rotational speed that may be greater or less than the rotational speed of the input shaft. In the embodiment shown and described herein, it is also possible for the IVT to be continuously adjusted between the neutral condition and a reverse condition wherein the output shaft is rotating in a direction that is opposite the previously defined forward direction. "IVT" is not intended to imply that an infinite rotation speed may be achieved, which, of course, would be impossible, only that a theoretically infinite number of ratios between the speed of the input shaft and the speed of the output shaft may be selected within a predetermined range of ratios. It should also be noted that the output shaft of IVT 10 does not actually operate within a set range of speeds but actually operates within a range of ratios, which, in this example, are between a positive or maximum forward ratio which could be a fraction or a multiple of the speed of rotation of the input shaft and a negative or maximum reverse ratio which is in a reverse direction when compared to the rotation of the input shaft and which could be a fraction or a multiple of the speed of rotation of the input shaft. However, for clarity, the remainder of this detailed description is written as if the speed and direction of rotation of the input shaft is constant which is often not the case in practice.

As can be seen in FIG. 1, IVT 10 includes an input differential 20, an output differential 50, a variator assembly 170 and a control differential 110. As can be seen in FIG. 1, input differential 20 is carried by an input shaft 22. Input shaft 22 is at least indirectly connected to a prime mover, which, in this example will be arranged and operated to rotate input shaft 22 at predetermined speed of rotation. In practice, the speed of input shaft 22 may vary. However, for purposes of this discussion, the skilled reader is asked to envision input shaft 22 rotating in the direction indicated by rotation arrow R1 at a constant speed of rotation. It may also be necessary, in some applications, to reduce the rate of rotation of input shaft 22 when compared with, for example, the rate of rotation of the crank shaft of a prime mover (not shown). And, it may also be necessary to increase the rate of rotation of other elements, such as a drive shaft, which may be powered by output shaft 52 by means of appropriate gearing or the like.

As can be seen in FIG. 1, input shaft 22 of input differential 20 presents two spider gear arms 24A and 24B that are fixed to input shaft 22 and which extend normally from input shaft 22. Spider gears 26A and 26B are rotatably mounted to spider gear arms 24A and 24B respectively. Input shaft 22 also carries a forward path gear member 32 and a reverse path gear member 36. Both forward path gear member 32 and reverse path gear member 36 are rotatably mounted to input shaft 22 and are constrained from sliding transversely (as will generally be the case for all such gear members in IVT 10). Forward path gear member 32 includes a bevel gear portion 32A that is arranged to mesh with spider gears 26A and 26B. Similarly, reverse gear member 36 further includes a bevel gear portion 36A that is also arranged to mesh with spider gears 26A and 26B. Thus, following the principles of a differential gear arrangement, forward path and reverse path gear members 32 and 36 may rotate at the same speed and in the same direction as input shaft 22, but because gear members 32 and 36 may freely rotate with respect to input shaft 22, they may also rotate at different speeds. Thus, according to the mechanics of a differential gears, if, for example, input shaft 22 is rotating at 200 rpm, but reverse path gear member 36 is constrained to rotate at 100 rpm, then forward path gear member 32 will be constrained to rotate at 300 rpm so that the average speed of forward and reverse path gear members 32 and 36 will be 200 rpm, the speed of rotation of input shaft 22. The skilled reader will see that many of the gears of input differential 20, output differential 50 and control differential 110 are shown in cross section but without section cross hatching. The skilled reader will note that the cross section of the control differential 110 is depicted as being cut through a plane which is above the plane cut through differential 20 and output differential 50. These things were done in order to simplify FIGS. 1-6. The skilled reader should understand that all of these gears are solids of revolution which present pluralities of gear teeth which are arranged to mesh so that gears shown in contact in FIGS. 1-6 mesh with each other.

As can be seen in FIG. 1, in this example, forward path gear member 32 further includes a spur gear portion 32B that is located adjacent to bevel gear portion 32A and a worm wheel portion 32C that is located adjacent to spur gear portion 32B. Similarly, reverse path gear member 36 also includes a spur gear portion 36B which is located adjacent to bevel gear portion 36A and a worm wheel portion 36C which is located adjacent to first spur gear portion 36B. The skilled reader will note that spur gear portion 32B of forward path gear member 32 is considerably smaller in diameter than spur gear portion 36B of reverse path gear member 36. The skilled reader will also note that spur gear portion 36B of reverse gear member 36 has the same diameter (and the same number of teeth) as a spur gear portion 66B of reverse path gear member 66 of output differential 50.

Input differential 20 is arranged so that forward path gear member 32 and reverse path gear member 36 rotate in the same direction as input shaft 22. However, as noted above, forward path gear member 32 and reverse path gear member 36 can be regulated to rotate at different speeds. As can be seen in FIG. 1, forward path and reverse path worms 72 and 76 mesh with worm wheel portion 32C of forward path gear member 32 and worm wheel portion 36C of reverse path gear member 36 respectively. The skilled reader should note that forward path worm 72 and shaft 142 that carries worm 72 are shown partially broken in FIG. 1 and FIGS. 4-6 in order to afford a less obstructed view of worm wheel portion 32C of forward path gear member 32. The skilled reader should understand that worm wheel portion 36C of reverse path gear member 36 is, in this example, symmetrically identical to worm wheel portion 32C. An unobstructed view of forward and reverse path gear members 32 and 36 can be seen in FIG. 2.

As is known by those skilled in the art, generally, a worm wheel will not drive a worm but a worm can drive a worm wheel. But, this is the case under certain conditions. The skilled reader may recall that a worm set can be said to be "self-locking" if the tangent of the worm wheel's helix angle is less than the coefficient of friction between the worm and the worm wheel. This prevents the worm wheel from back driving the worm. In this example, forward path worm 72 and worm wheel portion 32C together comprise a self-locking worm set as do reverse path worm 76 and worm wheel portion 36C. Accordingly, in this example, while it is possible for the rotation speed of worm 72 or 76 to limit the rotation speed of worm wheel portion 32C or 36C respectively, it is not possible for the rotation speeds of either worm wheel portion 32C or 36C to effect the rotation speeds of worm 72 or 76 respectively. In other words, worms 72 and 76 are only capable of regulating the relative speeds of rotation of forward path gear member 32 and reverse path gear member 36. And, of course, since forward path gear member 32 and reverse path gear member 36 are coupled to each other through a differential, they are able to rotate at different speeds. While the direction of rotation of worms 72 and 76 remains the same in this example, their relative rotation speeds are regulated by variator assembly 170 to rotate either at the same speed or at different speeds. This controls the relative rotation speeds of forward path gear member 32 and reverse path gear member 36. As will be explained in detail below, it is the differential speeds of worms 72 and 76 (and worm wheel portions 32C and 36C respectively) that ultimately determines the speed and direction of output shaft 52.

As can also be seen in FIG. 1, output differential 50 includes an output shaft 52, spider gears 56A and 56B as well as forward path gear member 62 and reverse path gear member 66. Output shaft 52 of output differential 50 presents two spider gear arms 54A and 54B that are fixed to output shaft 52 and that extend normally from output shaft 52. Spider gear arms 54A and 54B carry generally identical differential spider gears 56A and 56B. As was the case with input shaft 22, output shaft 52 also rotatably carries forward path gear member 62 and reverse path gear member 66.

Forward path gear member 62 of output differential 50 further includes a bevel gear portion 62A and a spur gear portion 62B. Bevel gear portion 62A of forward path gear member 62 is arranged to mesh with spider gears 56A and 56B. In this example, spur gear portion 62B is located adjacent to bevel gear portion 62A. Similarly, reverse gear member 66 further includes a bevel gear portion 66A and a spur gear portion 66B. Bevel gear portion 66A of reverse path gear member 66 is also arranged to mesh with spider gears 56A and 56B. The skilled reader will note that spur gear portion 62B of forward path gear member 62 is considerably smaller in diameter than spur gear portion 66B of reverse path gear member 66. Moreover, the skilled reader will note that spur gear portion 62B of forward path gear member 62 indirectly couples with forward path gear member 32 through an idler gear 82. Thus, with this arrangement, that is with idler gear 82 interposed between forward first spur gear portion 62B and spur gear portion 32B, forward path gear member 62 of output differential 50 will rotate in the same direction as forward path gear member 32 of input differential 20. However, since spur gear portion 66B of reverse path gear member 66 meshes directly with spur gear portion 36B of reverse path gear member 36, reverse path gear member 66 of output differential 50 will rotate in the opposite direction as reverse path gear member 36 of input differential 20. Since spur gear portion 62B of forward path gear portion 62 of output differential 50 has the same diameter as spur gear portion 32B of forward path gear portion 32 of input differential 20, the two spur gears, even though meshing indirectly through idler gear 82, will rotate at the same rate and in the same direction. Since spur gear portion 66B of reverse path gear portion 66 of output differential 50 has the same diameter as spur gear portion 36B of reverse path gear portion 36 of input differential 20, the two spur gears will also rotate at the same speed but will rotate in opposite directions.

A partial understanding of how input differential 20 and output differential 50 function may be understood by inspecting FIG. 1 and FIGS. 4-6. Thus, the skilled reader, while inspecting FIG. 1, may be able to envision how reverse path gear member 66 and forward path gear member 62 of output differential 50 may be regulated to counter rotate at exactly the same speed. This condition will occur if forward path gear member 32 and reverse path gear member 36 of input differential 20 are allowed to rotate at exactly the same speed. (Recall that idler gear 82 causes the direction of rotation of forward path gear member 62 of output differential 50 to be the same as that of forward path gear member 32 of input differential 20.) This will cause output differential 50 to operate so that output shaft 52 does not rotate. Spider gears 56A and 56B will merely spin at equal rates in opposite directions around their respective non-moving spider gear arms (52A and 52B) as output shaft 52 remains stationary. This is the neutral condition. If, however, input differential 20 is regulated so that forward path gear member 32 rotates faster than reverse path gear member 36, then the resulting faster rotation of forward path gear member 62 of output differential 50 (in the forward direction) will prevail within output differential 50 and cause output shaft 52 to rotate in a forward direction (indicated as direction F in FIG. 1) albeit at a reduced speed. If, on the other hand, input differential 20 is regulated so that reverse path gear member 36 rotates faster than forward path gear member 32, then the resulting faster rotation of reverse path gear member 66 of output differential 50 will prevail and cause output shaft 52 to rotate in a reverse direction (indicated as direction R), albeit at a reduced speed. Accordingly, it now remains for us to consider how variator assembly 170 and control differential 110 may be operated in order to regulate the relative speeds of rotation of forward path gear member 32 and reverse path gear member 36 of input differential 20.

As can be seen in FIG. 1, variator assembly 170 includes a forward path cone 172, a reverse path cone 176, a control wheel 174, that is carried by a control wheel shaft 174S, a forward path regulator shaft 142, a reverse path regulator shaft 146, a forward path worm 72 and a reverse path worm 76.

As can be also seen in FIG. 1, control differential 110 includes a variator input shaft 122, which, like the other shafts described above, presents two spider arms 124A and 124B that carry opposing spider gears 126A and 126B. Variator input shaft 122, in this example, is driven by a positive belt or gear arrangement connected at least indirectly to input shaft 22. In this example a first pulley 112 fixed to input shaft 22 drives a second, much smaller pulley 114 via a belt 116. Such an example belt and pulley arrangement is configured so that the ratio of the speed of variator input shaft 122 when compared to input shaft 22 is equal to the ratio that exists between forward and reverse path worm wheel portions 32C and 36C and worms 72 and 76 respectively. (Those skilled in the art will readily appreciate that any combination of ratios may be selected as long as the proper ratio is maintained in the worm wheel sets.) A pair of opposite gear members 132 and 136 having corresponding bevel gear portions 132A and 136A differentially transfer power from variator input shaft 122 to forward path regulator shaft 142 and reverse path regulator shaft 146 via a forward regulator shaft bevel gear 142A and a reverse regulator shaft bevel gear 146A. The skilled reader will note that in this example, the outboard bevel gear portions 132B and 136B of gear members 132 and 136 have been arranged to assure that forward path regulator shaft 142 and reverse path regulator shaft 146 rotate in the same direction. In this example, that "same direction" of forward and reverse regulator shafts 142 and 146 is clockwise if viewed from the ends that carry bevel gears 142A and 146A. To insure that the skilled reader harbors no confusion as to the direction of rotation of regulator shafts 142 and 146 in this example, the skilled reader may further observe that for such clockwise rotation, when IVT 10 is viewed from the perspective of FIG. 1, or FIGS. 3-6, the upper surfaces of regulator shafts 142 and 146, worms 72 and 76, bevel gears 142A and 146A and even cones 172 and 176 will appear to move from left to right.

Forward path regulator shaft 142 and reverse path regulator shaft 146 do not necessarily rotate at the same speed. Further, while sufficient power is transferred to variator input shaft 122 to power variator assembly 170, no power (or perhaps only a negligible amount of power) would be transferred from worms 72 and 76 to worm wheel portions 32C and 36C of input differential 20. The purpose of variator assembly 170 is to regulate the rotation speeds of gear members 32 and 36. (And, the applicant believes that, in a non-neutral condition, it is the speed of the faster rotating gear member that is actually being limited by the variator worm which engages the worm wheel of the faster rotating gear member while the other gear member merely idles at a speed which is consistent with the speed of the opposite variator worm.) The purpose of variator assembly 170 is not to provide power to gear members 32 and 36. Stated another way, variator assembly 170 may be thought of as if it is a "continuous escapement" that limits the speed of the dominant path. The worm of the dominant path may be also be described as a "continuous reaction member". Thus, the worm does not drive the worm wheel or transfer motive torque. The worm wheel of the dominant path (the forward path if forward rotation is selected by using the variator or the reverse path if reverse rotation is selected using the variator) reacts against the worm wheel, thereby allowing it to rotate at the rate dictated by the variator. Also, as noted above, the counterpart worm of the worm that is being reacted against can be said to be idling, rotating in sync with its associated worm wheel, neither driving nor retarding its associated worm wheel.

The varying rotation speeds of forward regulator shaft 142 and reverse regulator shaft 146 are controlled by adjusting the configuration of variator assembly 170 as shown in FIGS. 1 and 4-6. Thus, if control wheel 174 is placed in the A position indicated in FIGS. 1 and 4, cones 172 and 176 will rotate at the same rate (and, of course, in the same direction). This will cause regulator shafts 142 and 146 to rotate at the same speed and for worms 72 and 76 to rotate at the same speed. This causes forward path gear member 32 and reverse path gear member 36 of input differential 20 to rotate at the same speed (and, of course, in the same direction). As explained above, this regulates the rotations of forward path gear member 62 and reverse path gear member 66 of output differential 50 to counter-rotate at the same speed. This causes output shaft 52 to remain stationary. This is the neutral condition.

Figure 5:
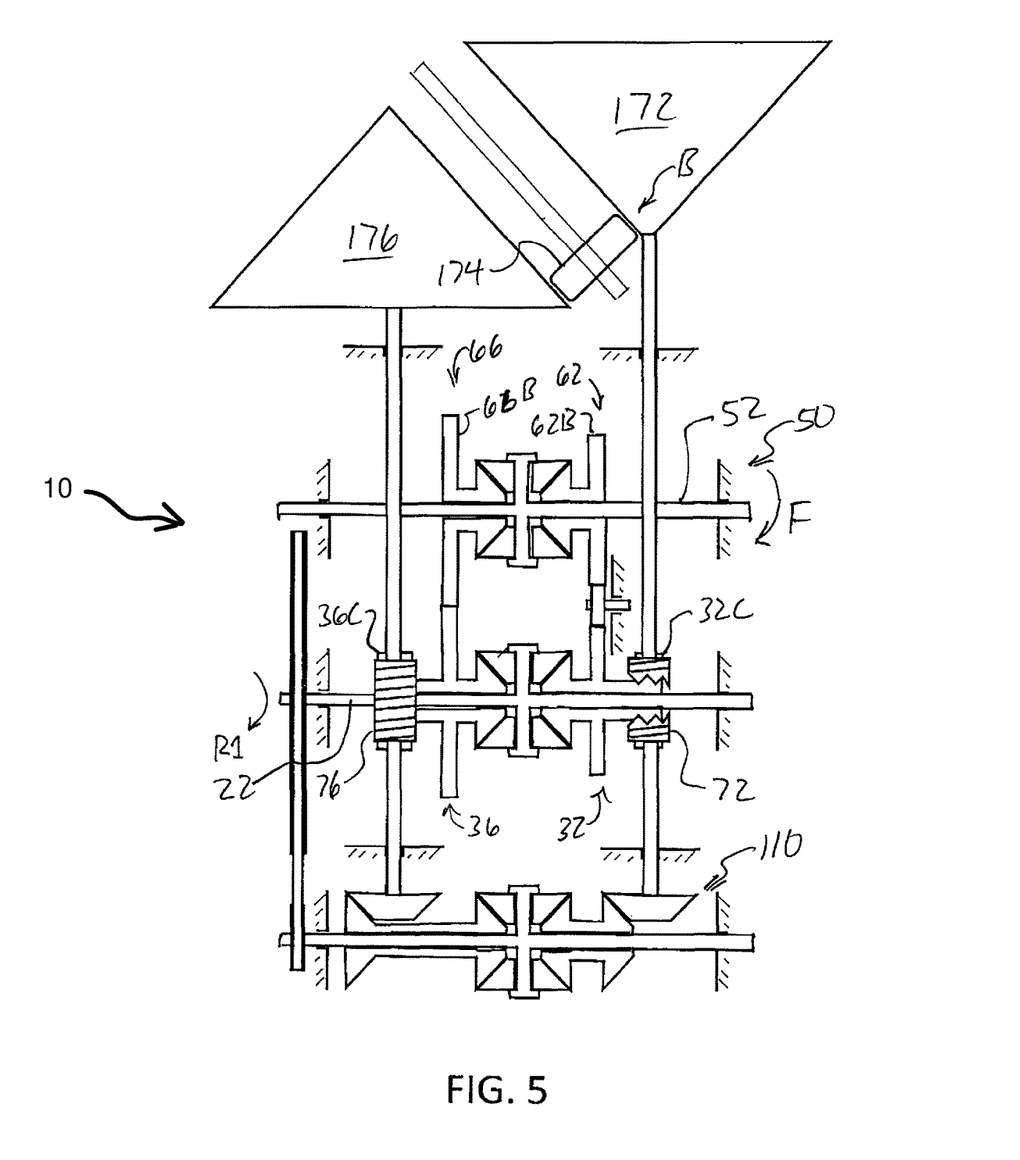
FIG. 5 is a third plan view of one embodiment of the infinitely variable transmission showing the infinitely variable transmission in the forward condition in which the output shaft rotates in a forward direction.

If control wheel 174 is placed in the B position indicated in FIG. 1 and as shown in FIG. 5, cone 172 will rotate much faster than cone 176. This will cause forward regulator shaft 142 to rotate faster than reverse regulator shaft 146 so that worm 72 rotates faster than worm 76. Also, it should be noted that in control differential 110, gear member 132 also rotates faster than gear member 136. As explained above, the faster rotation speed of worm 72 regulates the rotation of forward path gear member 32 of input differential 20 and, in turn, the forward rotation speed of forward path gear member 62 of output differential 50. While reverse gear member 66 of output differential 50 continues to counter-rotate, it does so at a speed which is slower than forward path gear member 62. In this example, the differential of output differential 50 more or less splits the difference so that output shaft 52 rotates in the forward direction indicated by F in FIGS. 1 and 5. This is the forward condition.

Figure 6:
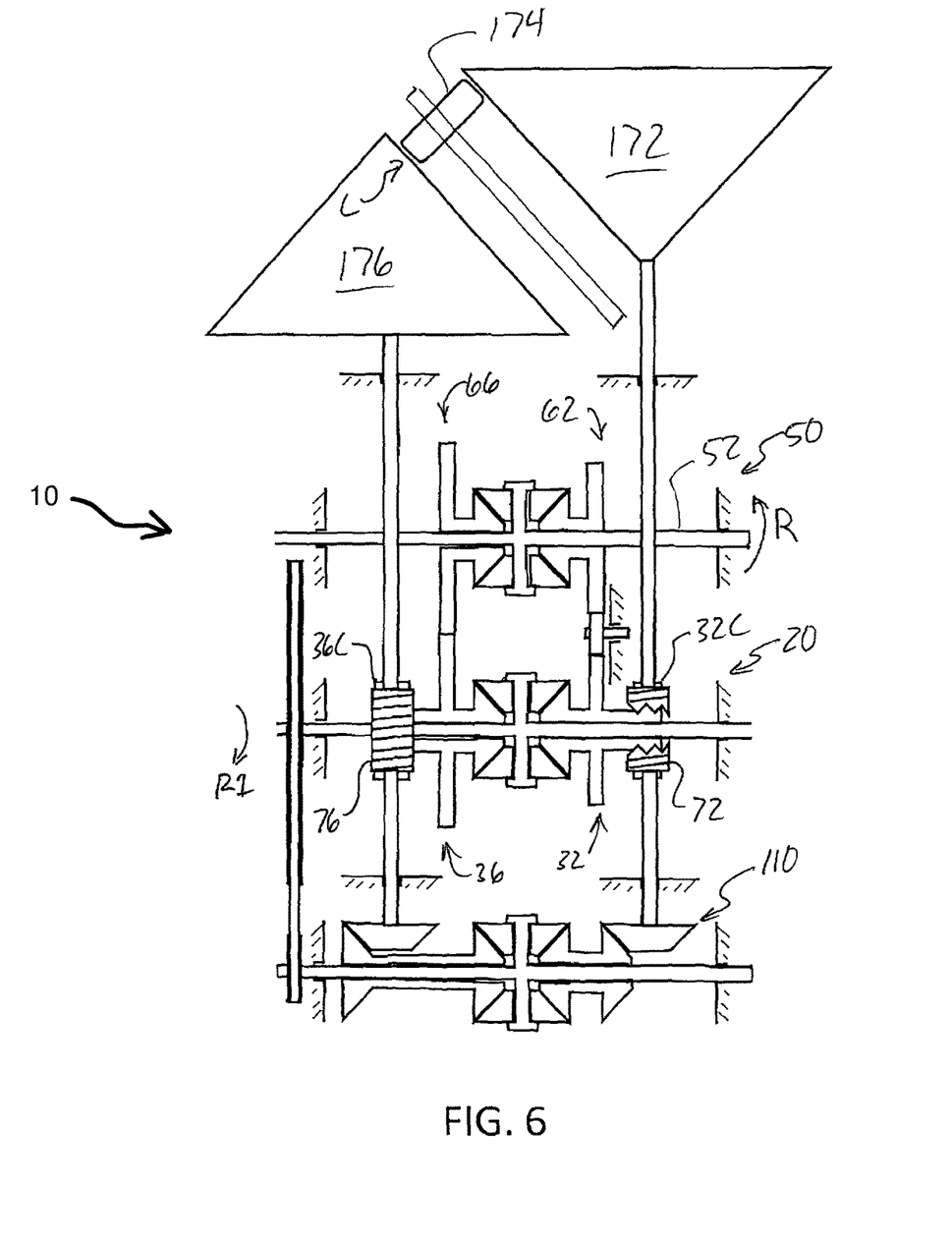
FIG. 6 is a fourth plan view of one embodiment of the infinitely variable transmission showing the infinitely variable transmission in the reverse condition in which the output shaft rotates in a reverse direction.

If, on the other hand, control wheel 174 is placed in the C position indicated in FIG. 1 and as shown in FIG. 6, cone 176 will rotate much faster than cone 172. This will cause reverse regulator shaft 146 to rotate faster than forward regulator shaft 142 so that worm 76 rotates faster than worm 72. As explained above, the faster rotation speed of worm 76 regulates the rotation of reverse path gear member 36 of input differential 20 and, in turn, the counter-rotation speed of reverse path gear member 66 of output differential 50. While forward gear member 62 of output differential 50 continues to rotate in the forward direction, it does so at a speed which is slower than reverse path gear member 66. Again, the differential of output differential 50 more or less splits the difference so that output shaft 52 rotates in the reverse direction indicated by R in FIG. 6. This is the reverse condition. Because control wheel 174 may be moved continuously into an infinite number of positions between position B and position C (including position A) this transmission may be referred to as an "infinitely variable transmission" or an IVT. Any one of an infinite number of positions may be selected between a reverse condition and a forward condition including a neutral condition between those two conditions. The skilled reader may easily imagine how, for a practical transmission, the reverse condition may be limited to a relatively slow rotation rate for output shaft 50, but that the range of rotation speeds for the forward condition could include a much larger range of rotation speeds than for the reverse condition.

Accordingly, the configuration and operation of one embodiment of IVT 10 has been described above. The skilled reader will readily appreciate that other forms of differential gearing may be selected for the input, output and control differentials. For example, more compact planetary type differential gear sets may be selected. Still further, a direct or indirect mechanical relationship between the transmission's input shaft and the shaft of the control differential may not be necessary in order to control the relative speeds of the forward path and reverse path gear members of the input differential.

Figure 7:
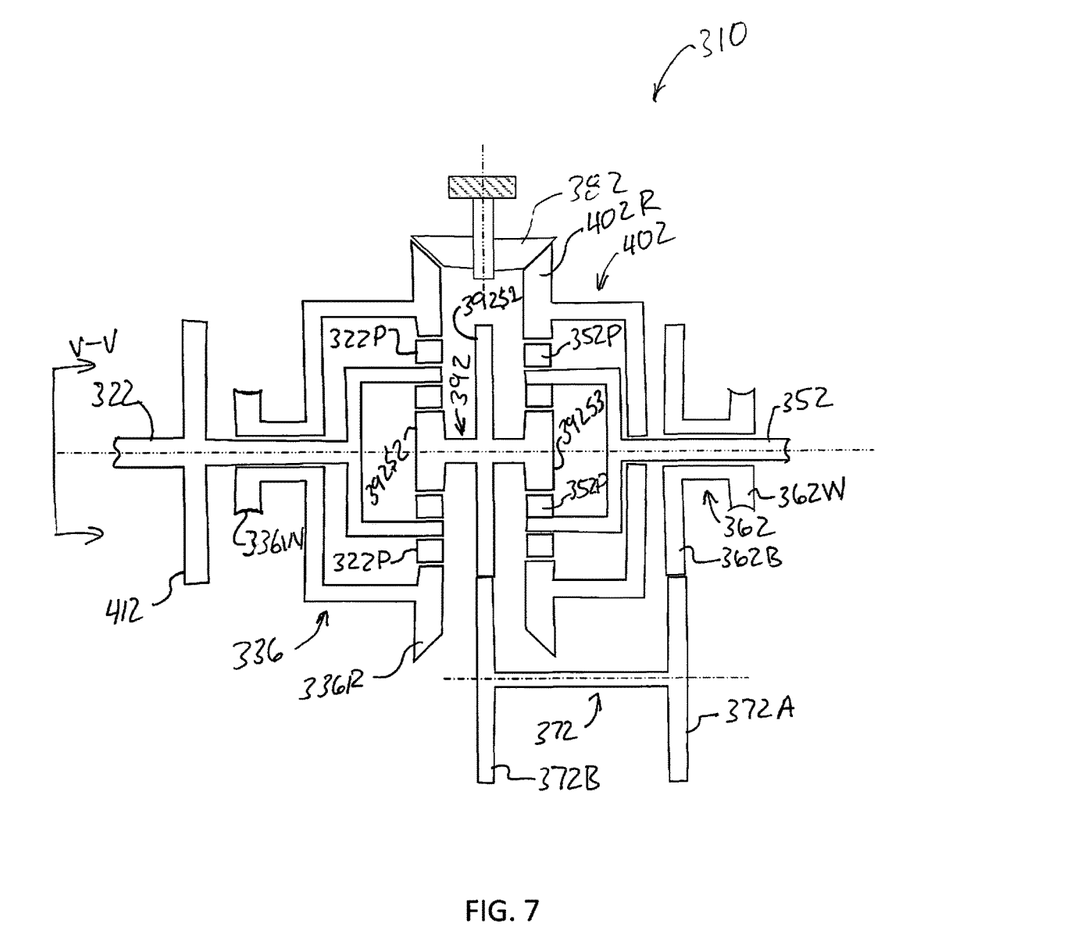
FIG. 7 is a plan view of a planetary gear embodiment of the infinitely variable transmission with the variator portion of the transmission removed for clarity.

FIG. 7 provides a schematic diagram of a portion of a planetary IVT transmission 310. The portion of transmission 310 shown in FIG. 7 is essentially a planetary version of input differential 20 and output differential 50 of IVT 10 described above. FIG. 7 does not show any portion of a variator assembly which would be analogous to variator assembly 170 described above or a control differential which would be analogous to control differential 110 described above. The skilled reader should assume that other variator components analogous to variator differential 110 and worms 72 and 76 would also be shown in FIG. 7 if they had not been removed for clarity. Thus transmission 310 also includes a forward path and a reverse path which are analogous to the forward and reverse paths described for IVT 10. Further, the skilled reader will notice that FIG. 7 is generally schematic and is intended to show a thinly sliced cross section of transmission 310. As was the case in FIGS. 1-6, gear teeth are not shown in FIG. 7. The skilled reader should assume the presence of meshing gear teeth on all of the schematically illustrated adjacent gear surfaces. In several places in FIG. 7 broken lines are used to indicate axes of rotation. The skilled reader should also assume that suitable bearings and the like are provided to facilitate the rotation of the various gear members and shafts which are centered on such axes. If a shaft or a bearing is omitted for clarity, the skilled reader should assume that one would be provided along the rotation axis to permit the rotation of the element about the axis indicated.

Referring to FIG. 7, IVT 310 includes an input shaft 322 which is analogous to input shaft 22 of IVT 10. Plane V-V indicates a view direction that will be used in this description to establish rotation direction. Thus, a clockwise rotation will be understood as the forward direction of rotation and will also be understood as being clockwise as viewed from the left side, looking to the right as indicated by plane V-V. In this example, the input shaft will always turn in a clockwise direction.

As is shown in FIG. 7, IVT 310 includes an output shaft 352. If the direction of the rotation of output shaft 352 as viewed from plane V-V is clockwise, the direction will be considered as a forward direction. If the rotation of output shaft 352 is counter-clockwise, the rotation direction will be considered as being in the reverse direction. Thus, this transmission, as was the case with IVT 10 is able to continuously transition between reverse, neutral and forward rotation conditions.

As can be seen in FIG. 7, a variator drive wheel 412 is fixed to input shaft 322. Variator drive wheel 412 could carry a belt such as belt 116 of IVT 10 for driving a variator, or drive wheel 412 could be a gear that meshes with a speed increasing gear set that also could drive a variator input shaft (not shown in FIG. 7) such as input shaft 122 of IVT 10 (shown in FIGS. 1, 4-6).

In this example, a reverse path gear member 336 is rotatably mounted to input shaft 322 adjacent to variator drive wheel 412. Reverse path gear member 336 includes a worm wheel portion 336W that is suitable for engaging a worm (not shown) and which would be similar in design and operation to worm 76 of IVT 10. In this example, worm wheel portion 336W and reverse path gear member 336 are controlled by the reverse side of a variator assembly (not shown) to rotate in the clockwise direction as was the case with IVT 10 described above. Reverse path gear member 336 also includes a reverse path ring gear portion 336R. Ring gear portion 336R presents gear teeth on its inner surface which mesh with planet gears 322P as will be described below. Ring gear portion 336R also presents a bevel gear surface on its outer surface which is suitable for meshing with an idler bevel gear 382. Thus, it is important to understand that ring gear portion 336R is not driven by the reverse side variator worm (which is not shown) via worm wheel portion 336W. The speed of ring gear portion 336R, which, in this example, is always rotating clockwise (when input shaft 322 is turning), is governed by the speed of a worm (not shown) that meshes with worm wheel portion 336W.

In this example, input shaft 322 is shown in FIG. 7 to branch into at least two arms that carry two planet gears 322P. Although FIG. 7 shows a planet carrier with two arms for simplicity, the skilled reader will appreciate that two or more planet gears may be used. (The applicant is not aware of practical planetary gear sets in which only one planet gear is present.) Typically, three or four planet gears are used in planetary gear sets rather than the two planet gears shown in FIG. 7. The configuration shown in FIG. 7 is intended as a schematic and might be considered unorthodox for a production transmission. Planet gears 322P mesh with the inside gear surface of ring gear portion 336R. Planet gears 322P also mesh with a sun gear portion 392S2 of a sun gear member 392 which will be described in greater detail below. In this example, the diameter and hence the ratio of the number of teeth between the ring and the sun in the planetary gear sets of IVT 310 is 3 to 1. The skilled reader will also appreciate, that in a planetary gear set the tooth count ratio as well as the diameter ratio between the ring gear and the planets will, in this example, also be 3 to 1. To relate IVT 310 to IVT 10, it may be helpful to consider the planetary gear set on the left side of FIG. 7 which includes ring gear member 336, planets 322P and their planet carrier as well as sun gear portion 392S2 as being analogous to input differential 20 of IVT 10. Thus, this portion of IVT 310 may be referred to as the input side of planetary transmission 310.

Thus far, the input side of planetary transmission 310 has been considered. The output side of planetary transmission 310 will now be considered. In this example, output shaft 352 is arranged on the same axis of rotation as input shaft 322 but is not directly connected to input shaft 322. Unlike input shaft 322, output shaft 352 may be regulated to rotate in the clockwise or forward direction or in the counter-clockwise or reverse direction (as perceived by viewing the rotation of output shaft 352 from the direction and vantage point of plane V-V) or may even be regulated to not turn at all, as in the neutral case as will be described below. A forward path gear member 362 is arranged to rotate on output shaft 352. Forward path gear member 362 includes a worm wheel portion 362W and a spur gear portion 362B. Much as was the case with worm portion 336W on the input side, the rotation of forward path gear member 362 on the output side is regulated by a forward path worm (not shown). This forward path worm (not shown) is associated with the forward path side of a variator assembly which may be configured much like the one described above for IVT 10 (with the possible substitution of a planetary differential for variator differential 110 of IVT 10). Accordingly, in this example, forward path gear member 362 is also regulated to always rotate clockwise (if input shaft 322 is also rotating clockwise).

As can be seen in FIG. 7, spur gear portion 362B of forward path gear member 362 meshes with a sun transfer gear member 372. Sun transfer gear member 372 includes a first spur gear portion 372A that meshes with spur gear portion 362B of forward path gear member 362 and a second spur gear portion 372B that meshes with a sun gear drive portion 392S1. Accordingly, as can be seen in FIG. 7, sun gear member 392 is arranged to rotate in the same direction, and in this example, at the same speed as forward path gear member 362.

As was the case with input shaft 322, output shaft 352 branches to present a planet carrier which carries at least two planet gears 352P (and preferably and more conventionally, at least three planet gears). A ring gear member 402 is also arranged to rotate on the same axis as output shaft 352 (which, in this example, is also co-axial with input shaft 322). As was the case with ring gear member 336, ring gear member 402 includes a ring gear portion 402R that presents an outside beveled gear surface for meshing with idler gear 382 and an inside gear surface for meshing with planet gears 352P. Planet gears 352P, in turn, mesh with sun gear portion 392S3 of sun gear member 392. Idler gear 382 also meshes with ring gear 336R of the input differential.

Recall that sun gear member 392 rotates in the clockwise direction with a speed that is governed by the speed of rotation of forward path gear member 362. Recall further, that the speed of rotation of forward path gear member 362 is governed by a variator (not shown) which engages forward path worm wheel 362W much as described above for IVT 10. The skilled reader will also note, in this example, and as noted above, ring gear portion 402R has three times the diameter and three times the tooth count as sun gear portion 392S3. Accordingly, in this example, the 3 to 1 ring/sun ratio necessitates a 3 to 1 speed ratio between the forward path worm wheel and the reverse path worm wheel in order to achieve a neutral condition. Still further, because ring gear 402 is driven by idler gear 382 which meshes with ring gear 336, ring gear 402 will counter-rotate with respect to ring gear 336 and sun gear portion 392S3.

Equipped with an understanding of the arrangement of planetary IVT transmission 310, it is now possible to consider the various modes of operation of which it is capable. First, let us consider the neutral condition. In this example, the neutral condition occurs when forward path gear member 362 and reverse path gear member 336 are controlled by a variator to rotate (clockwise) so that forward path gear member 362 rotates at three times the rate of reverse path gear member 336. Because of the presence of idler gear 382 between ring gear member 336R and ring gear member 402R, ring gear member 402R will counter-rotate with respect to ring gear member 336R and will do so at the same speed as ring gear member 336R. If sun gear portion 392 is rotating in the clockwise direction at three times the speed as the counter-rotating ring gear member 402 as stated above, then, in this example, planets 352P will not orbit. If planets 352P are not orbiting, then their planet carrier and output shaft 352 which is fixed to the planet carrier will not rotate. Another way to understand how planets 352P spin in place but do not orbit in the neutral condition is to consider that the tooth velocities on opposite sides of planets 352P are equal. This is because ring member 402R which has three times as many teeth as sun gear portion 392S3 is turning at one third the rotation speed of as sun gear portion 392S3 and in the opposite direction. The tooth velocities on opposite sides of planets 352P are equal and opposite and therefore cancel. This is the neutral condition.

As noted above for the neutral condition, when the tooth velocities on opposite sides of planets 352P are equal and opposite, the planet carrier and output shaft 352 do not rotate. But what happens when the tooth velocity on one side of planets 352P is greater than on the other side of planets 352P? When the tooth velocity of the forward rotating sun gear member 392S3 is regulated by forward path worm wheel portion 362W to be greater than the tooth velocity of counter-rotating ring gear member 402R which is regulated by reverse path worm wheel portion 336W, then the planets respond to the greater tooth velocity of sun gear member 392S3 and orbit in the direction of the sun's rotation which causes the carrier and output shaft 352 to rotate in the forward direction. When the opposite occurs, namely, when the tooth velocity of the reverse rotating ring gear member 402R is regulated to exceed the tooth velocity of the forward rotating sun gear member 392S3, then the planets orbit in the direction of the counter-rotating ring gear member 402R which causes the planet carrier and output shaft 352 to rotate in the reverse direction. The skilled reader will bear in mind, as noted above for this example as shown in FIG. 7, the "tooth velocities" for ring gear member 402R and sun gear member 392S3 will be equal and opposite if ring gear member 402R counter-rotates with respect to sun gear member 392S3 at ⅓ the rotation speed of sun gear member 392S3. This is the case because, in this example, for both the input differential and the output differential, the ring gears have three times the diameter and three times as many teeth as the sun gears.

The skilled reader will appreciate that by using a variator similar to the one used for IVT 10 described above, it will be possible to regulate IVT 310 away from the neutral condition described above either in the forward direction or the reverse direction and it will be possible to do so between the neutral condition and a maximum forward speed or between the neutral condition and a maximum reverse speed in a continuous manner as was the case for IVT 10. Thus because to continuously vary the speed of output shaft 352 between a maximum reverse rotation speed, a neutral condition and a maximum forward rotation speed, IVT 310 may be considered to be an infinitely variable transmission.

As can be seen in FIG. 7, planetary differential versions of the input and output differentials provide a promising alternative to the bevel gear differential version shown in FIGS. 1-6. It is possible that a planetary differential embodiment as shown in FIG. 7 and as described above could be the basis of a more compact or a more practical design for an IVT.

Whether an IVT be designed to include bevel gear differentials or planetary differentials or some combination thereof, what is needed, at a minimum, for a working IVT according to the present invention, is an input differential that includes an input shaft which is powered by a prime mover, wherein the input differential includes differentially associated forward path and reverse path gear members, wherein the relative speeds of rotation of the gear members are able to be differentially regulated within a predetermined range of ratios by a variator. What is further needed is an output differential that also has differentially associated forward path and reverse path gear members, wherein the forward path gear member of the output differential meshes with the forward path gear member of the input differential and wherein the reverse path gear member of the output differential meshes with the reverse path gear member of the input differential, and wherein an idler gear is interposed between the forward path gear members of the input and output differentials so that the gear members of the output differential rotate in opposite directions. The counter-rotation of the gear members of the output differential make it possible to control the speed and direction of the rotation of the output shaft of the output differential by controlling the respective speeds of rotation of the forward and reverse path gear members of the input differential. In the example above, if the respective speeds of rotation of the gear members of the input differential are equal, the output shaft will be stationary and neutral. If the speed of rotation (or speed in terms of tooth velocity in the case of a planetary differential) of the forward path gear member of the input differential is greater than the speed of rotation of the reverse path gear member of the input differential, then the output shaft will rotate in a direction that can be considered the forward direction (that is, in the same direction as the input shaft). If the speed of rotation of the reverse path gear member of the input differential (or tooth velocity in the case of a planetary differential) is greater than the speed of rotation of the forward path gear member of the input differential, then the output shaft will rotate in a reverse direction (that is, in opposite direction from the input shaft). And as the ratio of the above noted speeds of rotation increases, so will the speed of rotation of the output shaft.

As noted above, the differential gear sets described above and shown in the figures may be replaced by other types of gear sets that are arranged to perform the functions described above. For example, as is well known by those skilled in the art, planetary gear sets may be selected. Further, although worm and worm wheel sets were selected to mechanically associate the variator portion of the IVT with the input differential, other alternate arrangements may be selected. The applicant believes that speed regulation on both the forward and reverse gear portions of the input differential is needed because it is the speed of rotation of the regulating element (a worm in these examples) that ultimately regulates the differential speeds of rotation of the forward and reverse portions of the differential drive train. Variator cones 172 and 176 and wheel 174 may also be replaced by other suitable adjustable continuously variable mechanisms such as, for example, a variable pulley and belt assembly.

As can be seen from the above description and the figures, an infinitely variable transmission is provided that is able to provide for continuous variability between at least a first speed and a second speed, and more preferably provide for continuous variability in an output shaft between a forward condition and a reverse condition including a neutral condition in which the output shaft does not rotate.

The skilled reader will appreciate that there may be many strategies for controlling an IVT such as the ones described above. A vehicle operator could be presented with automatic transmission controls which would resemble those provided in a typical vehicle having an automatic transmission while a control system would be employed to translate operator inputs such as "gear" selection and accelerator position into IVT settings which are calculated to provide the best possible operating experience in terms of control, performance and efficiency. An IVT control system would likely have means for measuring torque and rotation speeds at various points in the drive train, including at least the input shaft and the output shaft. A control unit with a programmed processor could be employed to optimize the efficiency and performance of the prime mover and the IVT. Thus, for example, in a constant speed cruise mode, the objective might be to maintain the engine at the engine's most efficient setting or perhaps at a constant RPM while the fuel input is varied even as changes in grade are encountered. Or, in a constant speed mode, the objective might be to stay within a desired input shaft torque range by allowing the engine RPM to continuously vary as the "gear ratio" is continuously varied to maintain a constant driving speed even as changes in grade are encountered. Or the system could be programmed to balance both of these objectives.

It is to be understood that while certain forms of this invention have been illustrated and described, it is not limited thereto, except in so far as such limitations are included in the following claims and allowable equivalents thereof.

What is claimed is:

1. An infinitely variable transmission, comprising:
   (a) an input differential and an output differential,
   (b) the input differential and the output differential both including differentially associated forward path and reverse path gear members,
   (c) the input differential forward path gear member being meshed at least indirectly with the forward path output differential gear member so that output differential forward path gear member rotates in the same direction as the input differential forward path gear member, the input differential reverse path gear member being meshed at least indirectly with the output differential reverse path gear member such that the output differential reverse path gear member rotates in the opposite direction as the input differential forward path gear member, the relative rotation speeds of the input differential gear members being controlled by a variator assembly that is arranged to provide a continuous range for the selection of speed ratios between the forward path and the reverse path gear members of the input differential between predetermined speed ratios so that the forward path and reverse path gear members may be regulated to rotate at the same speed to cause the output shaft to not turn in a neutral condition and so that the speed ratios of the forward path and reverse path gear members may also be continuously regulated between the neutral condition and a non-neutral condition in at least one direction wherein one of either the forward path and reverse path gear members rotates faster than the other of the forward path or reverse path gear member.

2. The infinitely variable transmission of claim 1, wherein,
   the variator assembly includes a forward regulator shaft and a reverse regulator shaft which are associated by a variator which is able to be manipulated to select a ratio between the forward regulator shaft and the reverse regulator shaft,
   the variator assembly also including a variator input differential which is mechanically associated with the input shaft, the input differential mechanically associated with the forward regulator shaft and the reverse regulator shaft to power the rotations of the forward regulator shaft and the reverse regulator shaft while the ratio of the speeds of rotation of the forward regulator and the reverse regulator shafts is regulated by the variator, the rotation of the regulator shafts being differentially powered by the input differential,
   the forward regulator shaft carrying a worm that engages a worm wheel that is fixed to the forward gear member of the input differential, the reverse regulator shaft carrying a worm that engages a worm wheel that is fixed to the reverse gear member of the input differential, and wherein the speed of the input shaft of the variator differential is arranged to have a ratio with the input shaft of the input differential which is equal to the ratio between each worm and each worm wheel.

3. The infinitely variable transmission of claim 1, wherein,
   the at least one direction for the non-neutral condition includes a reverse direction and a forward direction such that the rotation of the output shaft is able to be continuously varied between the neutral condition and a maximum forward speed condition and continuously varied between the neutral condition and a maximum reverse speed condition.

4. The infinitely variable transmission of claim 2, wherein,
   the at least one direction for the non-neutral condition includes a reverse direction and a forward direction such that the rotation of the output shaft is able to be continuously varied between the neutral condition and a maximum forward speed condition and continuously varied between the neutral condition and a maximum reverse speed condition.

5. An infinitely variable transmission, comprising:
   (a) an input differential and an output differential,
   (b) the input differential and the output differential both including differentially associated forward path and reverse path gear members,
   (c) the input differential forward path gear member being meshed at least indirectly with the forward path output differential gear member so that output differential forward path gear member rotates in the same direction as the input differential forward path gear member, the input differential reverse path gear member being meshed at least indirectly with the output differential reverse path gear member such that the output differential reverse path gear member rotates in the opposite direction as the input differential forward path gear member, the relative rotation speeds of the input differential gear members being controlled by a variator assembly that is arranged to provide a continuous range for the selection of speed ratios between the forward path and the reverse path gear members of the input differential between predetermined speed ratios so that the forward path gear members are able to be regulated to rotate faster than the reverse path gear members to cause forward rotation of the output shaft, so that the reverse path gear members are able to be regulated to rotate faster than the forward path gear members to cause reverse rotation of the output shaft or so that the forward and reverse path gear members are able to be regulated to rotate at the same speed for a neutral state in which the output shaft does not rotate.

6. An infinitely variable transmission comprising:
(a) an input differential that is carried by an input shaft, the input shaft suitable for being driven by a prime mover, the input shaft presenting at least one spider shaft that is fixed to the input shaft and that projects normally from the input shaft, the at least one bevel gear shaft carrying a spider gear,
   (i) a forward path gear member rotatably arranged on a forward path side of the input shaft, the forward path gear member including a bevel gear portion that is arranged to mesh with the spider gear, the forward path gear member also including a spur gear portion and a worm wheel portion,
   (ii) a reverse path gear member rotatably arranged on a reverse path side of the input shaft that is opposite the forward path gear member, the reverse path gear member including a bevel gear portion that is also arranged to mesh with the spider gear, the reverse path gear member also including a spur gear portion and a worm wheel portion,
(b) an output differential that is carried by an output shaft, the output shaft presenting at least one spider shaft that is fixed to the output shaft and that projects normally from the output shaft, the at least one spider gear shaft carrying a spider gear,
   (i) a forward path gear member rotatably arranged on a forward path side of the output shaft, the forward path gear member including a bevel gear portion that is arranged to mesh with the spider gear, the forward path gear member also including a spur gear portion, the spur gear portion arranged to mesh at least indirectly with the spur gear portion of the forward path gear member of the input differential such that the output differential forward gear member rotates in the same direction of the input differential forward path gear member,
   (ii) a reverse path gear member rotatably arranged on a reverse path side of the output shaft, the reverse path gear member including a bevel gear portion that is arranged to mesh with the spider gear, the reverse path gear member also including a spur gear portion, the spur gear portion arranged to mesh at least indirectly with the spur gear portion of the reverse path gear member of the input differential such that the output differential reverse gear member rotates in the opposite direction of the input differential reverse path gear member,
(c) a control differential that is carried by an control shaft, the control shaft being at least indirectly driven by the input shaft such that there is a positive gear ratio between the control shaft and the input shaft, the control shaft presenting at least one spider shaft that is fixed to the control shaft and that projects normally from the control shaft, the at least one spider gear shaft carrying a spider gear,
   (i) a forward path bevel gear member rotatably arranged on a forward path side of the control shaft, the forward path bevel gear member including a first bevel gear portion that is arranged to mesh with the spider gear, the forward path bevel gear member also including a second bevel gear portion that is spaced away from the first bevel gear portion,
   (ii) a reverse path bevel gear member rotatably arranged on a reverse path side of the control shaft, the reverse path bevel gear member including a first bevel gear portion that is arranged to mesh with the spider gear, the reverse path bevel gear member also including a second bevel gear portion that is spaced away from the first bevel gear portion,
(d) a variator assembly that includes a common variable speed variator that is able to govern the speeds of rotation of a forward side variator shaft and a reverse side variator shaft, the forward side variator shaft presenting a bevel gear that meshes with the second bevel gear portion of the forward path bevel gear member of the control differential, the forward side variator shaft also presenting a worm that is arranged to mesh with the second spur gear portion of the forward path bevel gear member of the input differential, the reverse side variator shaft presenting a bevel gear that meshes with the second gear portion of the reverse path bevel gear member of the control differential, the reverse side variator shaft also presenting a worm that is arranged to mesh with the second spur gear portion of the reverse path bevel gear member of the input differential, the bevel gear portions of the reverse and forward gear members of the control differential and the bevel gears of the variator shafts being arranged such that the variator shafts rotate in the same direction, the common variable speed variator being arranged such that the speeds of the forward and reverse side variator shafts are able to be adjusted so that the speeds of rotation of the second spur gears of the forward and reverse path bevel gear members of the input differential may be varied thereby regulating the speed and direction of rotation of the output shaft, the variator being arranged such that when the forward side variator shaft is rotating faster than the reverse side variator shaft, the output shaft rotates in a forward direction, and such that when the reverse side variator shaft is rotating faster than the forward side variator shaft, the output shaft rotates in a reverse direction, and such that when the forward side variator shaft and the reverse side variator shaft are rotating at the same speed, the output shaft does not rotate thereby providing for a neutral condition.

7. An infinitely variable transmission, comprising:
(a) an input shaft coupled to a prime mover,
(b) an output shaft,
(c) first and second planetary gear sets, the first planetary gear set including a first ring gear a first sun gear and a first set of planet gears interposed between the first ring gear and the first sun gear, the second planetary gear set including a second ring gear, a second sun gear and a set of second planet gears interposed second ring gear and the second sun gear, the first sun gear and the second sun gear fixed in relation to each other thereby defining a sun gear member which presents the first and second sun gear, the first set of planetary gears set being carried by a first planet carrier, the first planet carrier being fixed to the input shaft, the second set of planetary gears being carried by a second planet carrier, the second planet carrier being fixed to the output shaft, the first ring gear and the second ring gear being coupled by an idler gear so that the second ring gear rotates in the opposite direction as the first ring gear, (d) the input shaft being coupled to a variator, the variator having a forward path portion and a reverse path portion, the variator being arranged for continuous adjustment of the ratio of the speeds of the forward path portion of the variator and the reverse path portion of the variator, forward path portion of the variator being coupled to the sun gear member and the reverse path portion of the variator being coupled to the first ring gear, the variator also being arranged such that it regulates the rotation of the first ring gear and the sun gear so that both the first ring gear and the sun gear rotate in the same direction as the input shaft, (e) the first and second planetary gear sets arranged such that when the speed reverse path and the forward path are regulated by the variator so that the ratio of the speeds of the second ring gear and the sun gear of the second planetary gear set is inversely proportional to the ratio their diameters, the second set of planet gears do not orbit and the second planet gear carrier as well as the output shaft do not rotate regardless of the rotation speed of the input shaft thereby resulting in a neutral condition, and such that continuous variation by the variator which increases the speed of the sun gear and decreases the speed of the ring gear from that of the neutral condition causes the planets to orbit in the same direction as the input shaft thereby causing forward rotation of the planet carrier and the output shaft, and such that continuous variation by the variator which decreases the speed of the sun gear and increases the speed of the counter-rotating ring gear from that of the neutral condition causes the planets to orbit in the opposite direction as the input shaft thereby causing reverse rotation of the planet carrier and the output shaft, and wherein the adjustments of the relative rotation speeds of the sun gear and the ring gear are able to be executed in a continuous manner between a maximum reverse speed, through a neutral condition and a maximum forward speed.

* * * * *